United States Patent

Sharp

[15] 3,702,407

[45] Nov. 7, 1972

[54] CIRCUIT FOR CONVERTING A VARIABLE FREQUENCY PULSE TRAIN INTO A RELATED ELECTRIC VOLTAGE

[72] Inventor: Denis Sharp, East Grinstead, England

[73] Assignee: U.S. Philips Corporation, New York, N.Y.

[22] Filed: July 27, 1970

[21] Appl. No.: 58,349

[30] Foreign Application Priority Data

July 25, 1969 Great Britain..........37,575/69

[52] U.S. Cl...................................307/233, 307/293

[51] Int. Cl................................................H03k 5/20

[58] Field of Search.............307/246, 293, 304, 233; 329/126; 324/78 E

[56] References Cited

UNITED STATES PATENTS

| | | | |
|---|---|---|---|
| 2,403,557 | 7/1946 | Sanders | 329/126 |
| 2,908,865 | 10/1959 | Campbell | 324/78 E |
| 3,548,318 | 12/1970 | Yorksie | 307/246 |
| 3,336,503 | 8/1967 | White | 307/304 |
| 3,567,960 | 3/1971 | Owen et al. | 307/246 |
| 3,196,292 | 7/1965 | McCutcheon | 307/293 |
| 3,267,289 | 8/1966 | Washington et al. | 307/293 |
| 3,233,190 | 2/1966 | Foulkes | 307/293 |
| 3,553,488 | 1/1971 | Darrow et al. | 307/246 |
| 3,351,864 | 11/1967 | Scribner | 307/233 |

*Primary Examiner*—Herman Karl Saalbach
*Assistant Examiner*—R. E. Hart
*Attorney*—Frank R. Trifari

[57] ABSTRACT

A frequency-to-DC converter circuit for producing an output voltage related to the frequency of a train of input pulses. The circuit includes an improved "diode pump" circuit in which the input capacitor discharges through a diode only to a given reference voltage different from ground potential during the period between successive input pulses. The reference voltage approximates the instantaneous voltage across the circuit storage capacitor. The output voltage is preferably taken from the junction of an RC time constant circuit. The converter is especially adapted to provide a speed signal in an anti-lock brake system.

7 Claims, 5 Drawing Figures

INVENTOR.
DENIS SHARP
BY [signature]
AGENT

*INVENTOR.*

DENIS SHARP

*BY* [signature]

AGENT

INVENTOR.
DENIS SHARP

BY

AGENT

A CIRCUIT FOR CONVERTING A VARIABLE FREQUENCY PULSE TRAIN INTO A RELATED ELECTRIC VOLTAGE

This invention relates to electrical circuit arrangements for converting a variable rate of pulse transmission into a related electrical output quantity.

According to the present invention such an electrical circuit arrangement comprises an input capacitor and a first diode connected in series, a storage capacitor arranged to be charged in response to input pulses applied to it through said input capacitor and then through said first diode, a discharge circuit through which the charge on said storage capacitor can decay during the periods between successive input pulses, a second diode through which the input capacitor can discharge during the periods between successive input pulses, and means permitting said input capacitor to discharge only to a reference voltage value which approximates the instantaneous voltage across said storage capacitor due to the level of the charge thereon, the output quantity from the arrangement being also derived from said storage capacitor in accordance with said level of charge. In particular, the last named means includes an emitter follower with its base connected to the storage capacitor so that the transistor conduction is determined by the instantaneous voltage across said storage capacitor. The emitter of the emitter follower is connected through a resistor to the terminal of the second diode remote from the input capacitor whereby the emitter voltage provides said reference voltage value, which approximates said storage capacitor instantaneous voltage. A further improvement is achieved by connecting the output terminal to the junction of an RC time constant element. This junction also is connected to said emitter via a third diode. The time constant element controls the rise time of the voltage at the output terminal for each period that the third diode is reverse biased by the emitter voltage.

In the operation of an electrical circuit arrangement according to the invention, the charge on said storage capacitor and thus the voltage across it is, in effect, "-pumped-up" in response to successive input pulses applied thereto through said first diode. This diode is reverse biased during the periods between successive pulses to isolate the storage capacitor from the input of the circuit. The higher the frequency of the applied pulses the faster the storage capacitor is "pumped" and thus the less the charge on it decays through said discharge circuit during said periods, and vice-versa, so that the output voltage (output quantity) existing across the storage capacitor is related to the frequency of the applied pulses. As will be described, the fact that the charge on the input capacitor is held to said reference voltage value ensures that a greater proportion of the pulse input voltage is utilized for "pumping" said storage capacitor than would be the case if the input capacitor were allowed to discharge fully between successive input pulses. This is an important feature of the circuit arrangement because it results in a more linear relationship between the frequency of the input pulses and the resulting output voltage, especially at frequencies around 1,000 cps. Another important feature, to be described below, is the provision of an RC time constant element to control the rise time of the output voltage at the output terminal of the circuit.

An electrical circuit arrangement according to the invention has a particular application in anti-lock brake systems for wheeled vehicles, that is, systems including means for improving braking performance of a vehicle by relieving the braking pressure applied to a road wheel of the vehicle if the wheel tends to lock on a slippery surface following brake application and then increasing the braking pressure again without any change in the actual braking action by a person using the brake. Such systems can be successful in reducing the risk of skidding due to wheel lock and in maintaining directional control during braking, and can also reduce braking distances.

This application is in control circuit means of an anti-lock vehicle brake system of the character comprising, for use in conjunction with a vehicle wheel and associated wheel brake, a wheel movement sensor for producing electrical signals related to rotational movement of the wheel, control circuit means which is responsive to said electrical signals to produce an electrical output in dependence on a particular criterion related to wheel rotational movement, and control valve means which is arranged for actuation in response to said electrical output to relieve the braking pressure applied from a fluid pressure source of the system to the wheel brake. A suitable criterion — though not the only one — is when deceleration of the wheel is in excess of a predetermined value.

In this application, the electrical circuit arrangement is used to provide a voltage of a value related to the frequency of a pulse train (constituting said electrical signals) which is generated in response to wheel rotational movement by, for example, magnetic interaction between a ferromagnetic toothed ring rotatable with the wheel and an electromagnetic pick-up which is positioned adjacent to the ring to sense the change of flux as each tooth of the ring passes it when the wheel revolves, said ring and pick-up constituting the wheel movement sensor. The resulting output voltage thus produced, which is related to the frequency of the pulse train, can be utilized in the control circuit means for determining when the electrical output from the latter is to be produced for actuating the control valve. The use of the electrical circuit arrangement is particularly advantageous in this application because it can maintain an accurate linear relationship between pulse input frequency and the related voltage output over a wide range of wheel speed. The RC time constant element for controlling the rise time of the output voltage at the output terminal provides another advantage in that it eliminates the production of spurious output signals due to, for example, whipping of the vehicle suspension and tensional or longitudinal vibrations thereof. This results because the RC element provides an indication of a minimum rate of wheel acceleration above which the circuit ignores.

The present invention also provides an anti-lock vehicle brake system of the above character having control circuit means embodying an electrical circuit arrangement as set forth above.

In order that the invention may be more fully understood, reference will now be made by way of example to the accompanying drawings in which:

FIG. 2 is a block diagram of a control circuit of an anti-lock vehicle brake system of the character referred to;

FIG. 4 is a block diagram of an anti-lock vehicle brake system of the character referred to.

Figure 1:
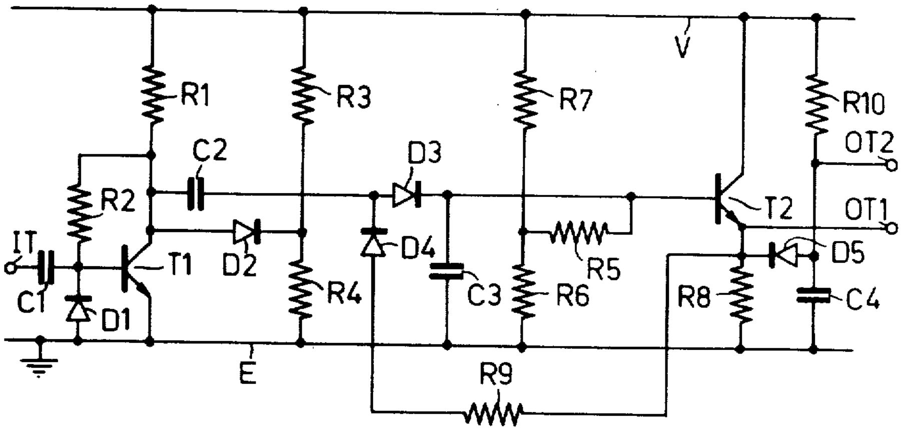
FIG. 1 shows an electrical circuit arrangement conforming to the invention.

Referring to the drawings, the electrical circuit arrangement shown in FIG. 1 comprises an input transistor T1 having its base connected to an input terminal IT via a capacitor C1. The emitter of the transistor T1 is connected directly to a ground line E and its collector is connected via a collector resistor R1 to a voltage supply line V. The transistor T1 is biased at the threshold of conduction by means of a resistor R2 connected between its collector and base. The transistor T1 functions as an amplifier and limiter to produce at its collector a square wave voltage in response to an alternating or pulse input applied to the input terminal IT. A diode D1 serves to prevent the d.c. bias at the base of the transistor T1 from shifting due to the rectification of the alternating or pulse input by the base/emitter diode of the transistor T1. Resistors R3 and R4 and a diode D2 limit the position voltage swing at the collector of the transistor T1.

The square wave voltage which is produced at the collector of transistor T1 is represented by the waveform diagram in FIG. 5*a*. This square wave voltage is applied via an input capacitor C2 to a diode D3 and positive half-cycles of the square wave voltage pass through this diode and charge a storage capacitor C3. A further diode D4, which is connected at the junction of the input capacitor C2 and diode D3, is reverse biased during the positive half-cycles of the square wave voltage. The voltage at this junction is represented by the waveform diagram in FIG. 5*b*. During the negative half-cycles of the square wave voltage applied through the input capacitor C2, the diode D3 is reverse biased and the storage capacitor C3 commences to discharge through a resistor R5 towards the potential at the junction of two resistors R6 and R7 which are connected in series between the ground line E and the voltage supply line V. The voltage across the storage capacitor C3 is represented by the waveform diagram in FIG. 55*c*. This voltage is also present at the base of an emitter follower transistor T2, so that a voltage which is decaying correspondingly with the decaying voltage across the storage capacitor C3 is developed across emitter resistor R8 of the transistor T2. Also, during the negative half-cycles of the square wave voltage applied through the input capacitor C2, the diode D4 is forward biased so that the input capacitor C2 discharges through this diode and a resistor R9 to cause the potential at the junction of capacitor C2 and diode D3 to fall to a value determined by the potential at the emitter of transistor T2.

Each succeeding positive half-cycle of the square wave voltage applied through the input capacitor C2 in effect "pumps-up" the charge on the storage capacitor C3 and the periods between successive positive half-cycles, in dependence on the frequency of the square wave voltage, determines the extent that the charge on the storage capacitor C3 decays during the intervening negative half-cycles. Thus the voltage across the storage capacitor C3 and also the voltage at the emitter of transistor T2 is representative of the frequency of the alternating or pulse input applied to the input terminal IT. This voltage, which is represented by full lines in the waveform diagram of FIG. 5*d*, can be utilized directly as an output voltage appearing at the output terminal OT1, this output voltage having a fast response to a change in input frequency but a high ripple content. Alternatively, an output voltage can be taken from the circuit at output terminal OT2 which is connected to the junction of a resistor R10 and a capacitor C4 which are connected in series between the ground line E and the voltage supply line V. This junction is connected to the emitter of transistor T2 via a diode D5. This output voltage at output terminal OT2 is represented by dotted lines in the waveform diagram in FIG. 5*d* from which it can be seen that this output voltage has a lower ripple content than the output voltage at output terminal OT1. This lower ripple content is due to the effect of the capacitor C4 and resistor R10 which together form a time constant circuit for controlling the rise time of the output voltage at output terminal OT2 for the period that diode D5 is reverse biased due to the positive voltage swing at the emitter of the transistor T2.

The electrical circuit arrangement of FIG. 1 provides a better linear relationship between input frequency and output voltage at frequencies up to 1,000 cps than would be obtained if the anode of diode D4 were connected to the ground line E instead of to the emitter of transistor T2. The reason for this is that with the circuit arrangement shown, the d.c. level at the junction of the input capacitor C2 and diode D3 remains higher so that even at higher frequencies, for which the storage capacitor C3 retains a high proportion of its charge, there is a large value of sawtooth voltage in excess of the voltage across the capacitor C3 which is available through diode D3 to "pump-up" the capacitor C3. As indicated in dotted lines in the waveform diagram of FIG. 5*c*, this would not be the case if the diode D4 were connected to ground, because most of the voltage through the input capacitor C2 would be taken up in restoring the level of the potential at the junction of capacitor C2 and diode D3 to a value appropriate for forward biassing the diode D3 so that only a small value of sawtooth voltage would remain, in excess of the voltage already existing across the storage capacitor C3, to pump-up the latter. Thus, the linear relationship between input frequency and output voltage would fall off at higher frequencies.

As aforesaid, an electrical circuit arrangement according to the invention has application in control circuit means of an anti-lock vehicle brake system of the character referred to, and an example of this application will now be considered.

Figure 2:
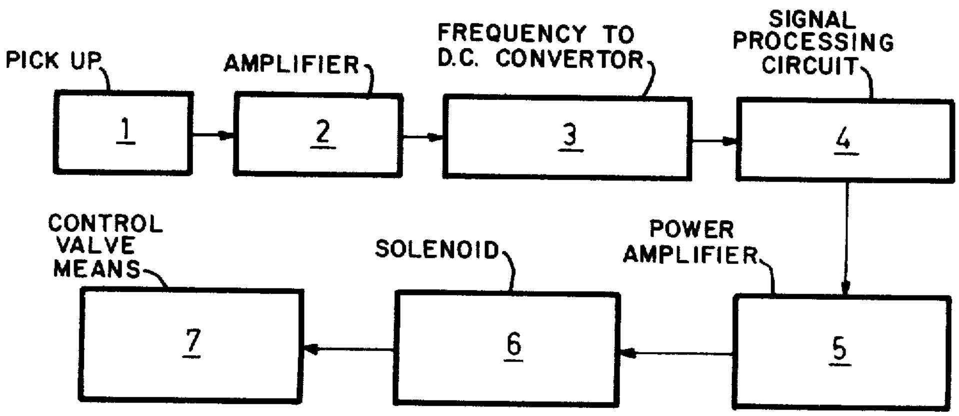

Turning now to FIG. 2, the control circuit means represented by the block diagram there shown is responsive to pulses related to rotational movement of a vehicle wheel. These pulses may be produced by an electromagnetic pick-up 1 which, as aforesaid, is associated with a ferromagnetic toothed ring rotatable with the wheel to sense change of flux as each tooth of the revolving ring passes it. The pulse output from the pick-up 1 is amplified and limited by an amplifier 2, and the resulting square wave output is applied to a frequency-tooDC convertor 3 which can be an electrical circuit arrangement conforming to the present invention and which is responsive to the square wave output to produce an output voltage of a magnitude related to the frequency of the pulses supplied by the pick-up 1. This output voltage is applied to a signal processing circuit 4 which is responsive to produce an output in dependence on a particular criterion related to wheel rotational movement as signified by the output voltage from the convertor 3. The output from the circuit 4 is amplified by a power amplifier 5, and the output from the power amplifier 5 is utilized to operate a solenoid 6 which is adapted to actuate control valve means 7 of an anti-lock vehicle brake system.

Figure 3:
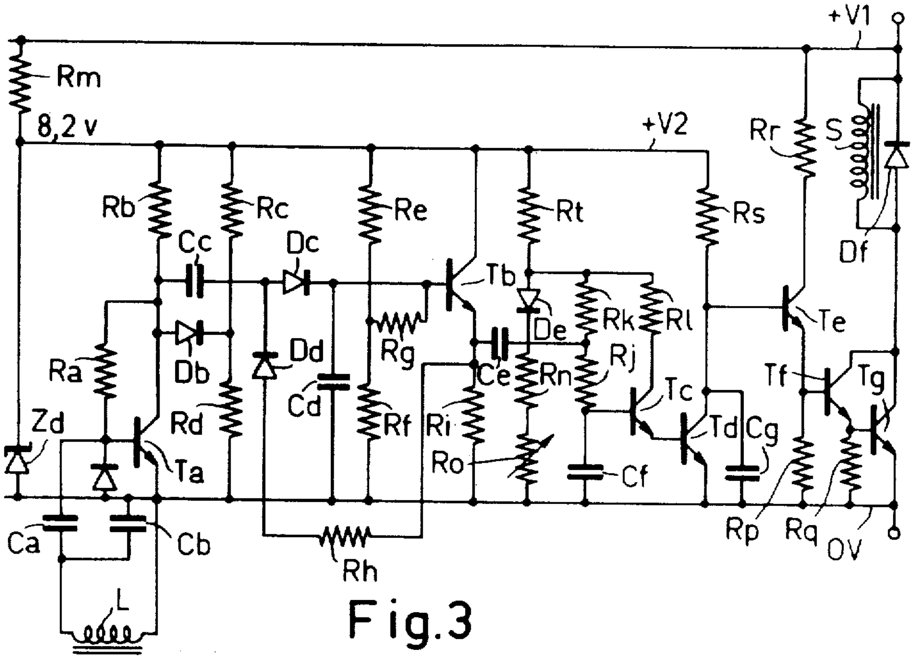
FIG. 3 is a circuit diagram of the control circuit means of FIG. 2 and including the electrical circuit arrangement of FIG. 1.

In the circuit diagram of the control circuit means shown in FIG 3, the pick-up is represented only by its output coil L. The pulse output from this pick-up output coil L is coupled into the base of a transistor Ta via a capacitor Ca. A capacitor Cb serves to remove unwanted interference in the output from the coil L. A diode Da serves to prevent the d.c. bias at the base of transistor Ta, as provided by a resistor Ra connected between the base and collector of this transistor, from shifting due to the rectification of the pulse input train by the base/emitter diode of the transistor Ta. This transistor Ta and its associated components Ra, Rb, Ca, Cb and Da comprise the amplifier 2 in FIG. 2.

The output produced at the collector of transistor Ta is a square wave voltage which is fed to an electrical circuit arrangement according to the invention. This electrical circuit arrangement comprises components Cc, Cd, Rc, Rd, Re, Rf, Rg, Rh, Ri, Db, Dc, Dd, and Tb and operates as previously described with reference to FIG. 1. This electrical circuit arrangement forms the frequency-to-DC convertor 3 of FIG. 2 and produces at the emitter of transistor Tb an output voltage whose value is related to the frequency of the pulse output supplied by the pick-up, and may thus be termed a speed signal as it is directly related to wheel speed. This output voltage (speed signal) is coupled to the base of a normally conductive transistor Tc via a capacitor Ce and a resistor Rj. The value of this capacitor Ce and the value of a resistor Rk to which this capacitor is also coupled, determine a selected wheel deceleration at which transistor Tc and a further normally conductive transistor Td are rendered non-conductive in response to the value of speed signal then obtaining. This in turn causes a normally non-conductive transistor Te to become conductive. The components Ce, Cf, Tc, Td, Rj, Rk, Rl and De essentially comprise the signal processing circuit 4 of FIG. 2. The resistor Rk, which together with resistor Rj forms a potential divider in the base circuit of transistor Tc, provides a current sufficient to drive the base of transistor Tc with about 10 times the current needed to maintain the two transistors Tc and Td normally conductive. Thus the selected wheel deceleration at which transistor Te becomes conductive is virtually independent of the gains of the transistors Tc and Td. The resistor Rl in the collector circuit of transistor Tc serves to limit the base current of transistor Td, and the capacitor Cf and the resistor Rj in the base circuit of transistor Tc makes the circuit insensitive to ripple in the speed signal. The diode De serves to stabilize the base current of the transistor Tc against temperature changes. A capacitor Cg serves to prevent spurious oscillation at high frequencies due to the transistors being capable of working up to 80 M/cs.

A transistor Tf and a further transistor Tg amplify the output from transistor Te. These transistors Te, Tf, and Tg form the power amplifier 5 of FIG. 2. The output from transistor Tg drives a solenoid S which corresponds to the solenoid 6 in FIG. 2. A diode Df serves to clip overshoot voltage on the solenoid S when it is switched off, thereby preventing too high a voltage from being applied to the collector of transistor Tg.

The circuit parameters would be so chosen that the solenoid would be turned off when the wheel being sensed has accelerated up to the speed it would have been doing if it had continued to decelerate from its initial speed, at the instant of braking, at a rate equal to the selected wheel deceleration at which the solenoid was turned on.

It is also arranged that the solenoid S is turned off after a predetermined period, even if the wheel does not re-accelerate after the solenoid S has been turned on. This is achieved by means of capacitor Ce which, in conjunction with resistor Rk, serves as an a.c. coupling to differentiate the speed signal so that after a certain period of energization of the solenoid, as determined by the time constant of this a.c. coupling, the transistors Tc and Td are rendered conductive again to render transistor Tg non-conductive to de-energize the solenoid. However, since the capacitor Ce and resistor Rk also determine the selected wheel deceleration, the time constant of the a.c. coupling afforded by these components cannot be varied, to vary the period before the solenoid is de-energized in the absence of wheel re-acceleration, without also varying the selected wheel deceleration. A separate a.c. coupling which is independent of capacitor Ce and resistor Rk suitably comprises a further capacitor connected in the base circuit of transistor Te, together with a further resistor connected between this base and the OV line.

The circuit of FIG. 3 may be modified in that if a capacitor Ce of large value and higher gain transistors are used, the transistor Tc and its collector resistor Rl can be dispensed with and the junction of resistor Rj and capacitor Ce can then be connected directly to the base of transistor Td.

The circuit of FIG. 3 is energized by a suitable supply voltage connected across the supply lines +Vl and OV, and a resistor Rm and a zener diode Zd provide a stabilized voltage +V2 from the supply voltage.

In each of the circuits of FIGS. 1 and 3, transistors of opposite type to those shown may be used with suitable adjustment of the voltage supply lines.

Suitable components and component values for the circuit diagram of FIG. 3 are as follows for a wheel diameter of 2 feet having 60 teeth/revolution on a toothed ring attached thereto, for which a typical output voltage from the magnetic pick-up would be 1 volt peak at 100 cps. (7mph) and 10 volts peak at 1,000 cps. (approx. 70mph).

Resistors

| | |
|---|---|
| R- 1M ohms | Rj - 33K ohms |
| Rb - 18K ohms | Rk - 470K ohms |
| Rc - 1K ohms | Rl - 470K ohms |
| Rd - 1K ohms | Rm - 150 ohms |

| | |
|---|---|
| Re - 68K ohms | Rn - 4K ohms |
| Rf - 10K ohms | Ro - 10K ohms |
| Rg - 100K ohms | Rp - 10K ohms |
| Rh - 1K ohms | Rq - 1K ohms |
| Ri - 10K ohms | Rr - 150 ohms |
| | Rs - 33K ohms |
| | Rt - 10K ohms |

| Capacitors | Transistors |
|---|---|
| Ca - .22μF | Ta - type BC 109 (Mullard) |
| Cb - 0.1μF | Tb " " |
| Cc - 0.022μF | Tc " " |
| Cd - 0.1μF | Td " " |
| Ce - 1.0μF | Te " " |
| Cf - 0.1μF | Tf - BFY 52 " |
| Cg - 2KpF | Tg - BDY10 " |

| Diodes | Voltages |
|---|---|
| Zd - 8.2V zener (Mullard) | +V= 12 volts |
| Da - type OA202 " | |
| Db - " " | |
| Dc - " " | |
| Dd - " " | |
| De - " " | |
| Df - BYZ10 " | |

Figure 4:
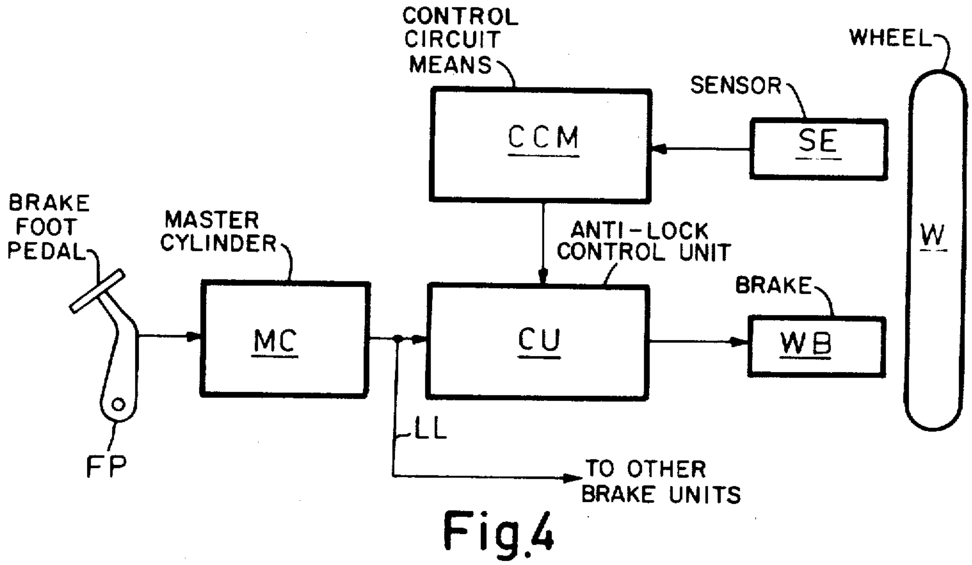

FIG. 4 shows diagrammatically a general layout for an anti-lock vehicle brake system in which the present invention can be embodied. This layout shows a brake foot pedal FP for actuating the piston of a master cylinder MC which constitutes a fluid pressure source of the system. The master cylinder is arranged to actuate (directly or via a servo) a wheel brake WB for a vehicle wheel W via an anti-lock control unit CU. A wheel movement sensor SE applies electrical pulses related to wheel rotational movement to a control circuit means CCM. The anti-lock control unit CU would include control valve means which is arranged for actuation in response to an electrical output from the control circuit means CCM to relieve the braking pressure applied to the wheel brake WB. This system is of the character previously referred to, and in the present instance in which the control circuit means is in accordance with FIGS. 2 and 3, the electrical output would be produced from the control circuit means CCM when the deceleration of the wheel is in excess of a predetermined value. The wheel movement sensor SE would be the pick-up 1 and the solenoid 6 and the control valve means 7 would be included in the anti-lock control unit CU.

Figure 5:
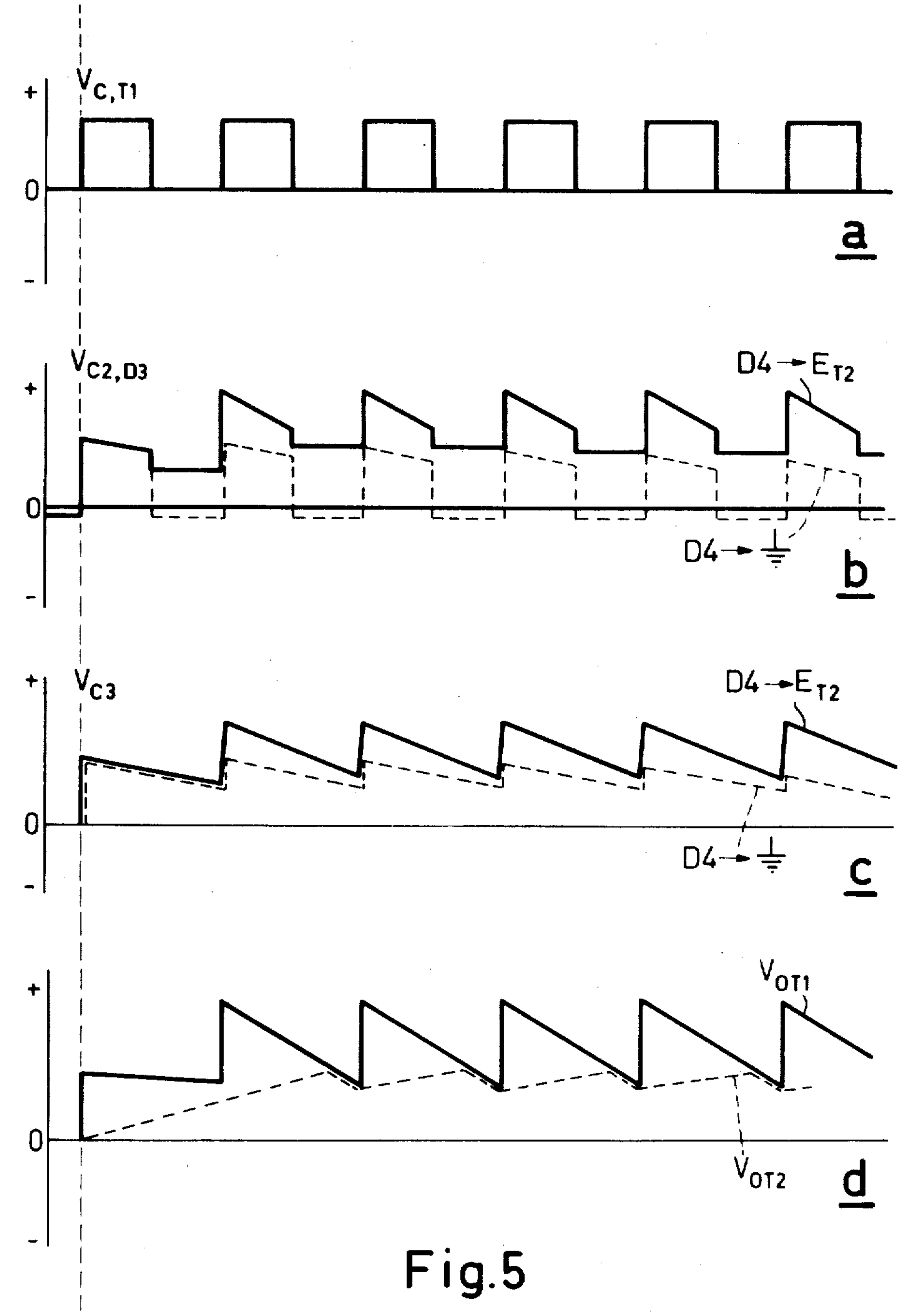
FIG. 5 shows explanatory waveform diagrams.

As indicated by the lead LL, separate systems as shown in FIG. 5 (with a common fluid pressure source) may be provided in respect of each road wheel of a vehicle, but it would also be possible to provide a single system for two(rear) wheels driven by a vehicle drive shaft with a sensor associated with the shaft for producing the electrical signals related to wheel rotational movement. As an alternative, a single anti-lock control unit including control valve means may be provided in common for all the road wheels of a vehicle. In this case each road wheel would have its own wheel movement sensor and associated control circuit means, and any of the latter would provide an electrical output to actuate the control valve means when the appertaining wheel tends towards a locked condition.

As alternatives to the particular form of signal processing circuit shown in FIG. 3, any of the signal processing circuits described in co-pending U.S. application Ser. No. 884,551, filed Dec. 12, 1969, can be used. A control circuit means as thus embodied can be for an anti-lock vehicle brake system as described in U.S. application Ser. No. 215,622 filed Jan. 5, 1972.

I claim:

1. An electrical converter circuit comprising a pair of input terminals adapted to receive a train of input pulses of variable frequency, an input capacitor and a first diode connected in series circuit to said input terminals, a storage capacitor arranged to capacitor, charged in response to input pulses applied to it through the series circuit comprising said input capacitor and said first diode, a discharge circuit connected to said storage capacitor through which the charge on said storage capacitor can decay during the periods between successive input pulses, a second diode coupled to the input capacitor through which said input capacitor can discharge during the periods between successive input pulses, and means including said second diode for clamping the junction of the input capacitor and the first diode to a reference voltage value which approximates the instantaneous voltage across said storage capacitor and an output terminal coupled to said storage capacitor for deriving an output voltage proportional to the frequency of the input pulses.

2. A converter circuit as claimed in claim 1 wherein said storage capacitor is connected in series with the input capacitor and the first diode across said input terminals and said clamping means comprises the second diode and a resistor connected in series between said junction and said output terminal.

3. A converter circuit comprising a pair of input terminals adapted to receive a train of input pulses of variable frequency, an input capacitor and a first diode connected in series to said terminals, a storage capacitor connected in circuit so as to be charged up in response to input pulses applied to it through said input capacitor and said first diode, a discharge circuit connected to said storage capacitor to allow the charge thereon to decay during the periods between successive input pulses, a second diode coupled to the input capacitor and poled to allow said input capacitor to discharge during said periods between successive input pulses, a transistor connected as an emitter follower with its base connected to the storage capacitor thereby to provide a reference voltage at the emitter which approximates the instantaneous voltage across the storage capacitor, means including a resistor for connecting said emitter to a terminal of the second diode remote from the input capacitor whereby the input capacitor can only discharge to the value of said reference voltage at the emitter of the transistor emitter follower, an RC time constant element with a junction connected to said emitter via a third diode, and an output terminal connected to said RC junction whereby the rise time of an output voltage developed at said output terminal is controlled by said time constant element during each period that said third diode is reverse biased by the emitter voltage of said emitter follower.

4. A converter as claimed in claim 3 wherein said input capacitor, said first diode, and said storage capacitor are connected in a series circuit across said input terminals and the second diode is connected between the junction point of the innut capacitor and the first diode and the emitter of the emitter follower.

5. A converter as claimed in claim 3 wherein said RC time constant element comprises a resistor and capacitor connected in series across a source of DC supply voltage.

6. A converter as claimed in claim 4 wherein said first and second diodes are poled so that the anode of one diode and the cathode of the other are connected to said junction point.

7. A converter as claimed in claim 5 wherein the emitter follower transistor is of the NPN type and the third diode has its cathode directly connected to the emitter and its anode connected to the junction of said resistor and capacitor.

* * * * *

PO-1050
(5/69)

UNITED STATES PATENT OFFICE
CERTIFICATE OF CORRECTION

Patent No. 3,702,407 Dated November 7, 1972

Inventor(s) DENIS SHARP

It is certified that error appears in the above-identified patent and that said Letters Patent are hereby corrected as shown below:

Column 8, line 13, change "capacitor" , second occurrence, to -- be --.

Signed and sealed this 15th day of May 1973.

(SEAL)
Attest:

EDWARD M.FLETCHER,JR.
Attesting Officer

ROBERT GOTTSCHALK
Commissioner of Patents